United States Patent
Robins (10) Patent No.: US 8,773,685 B2
(45) Date of Patent: Jul. 8, 2014

(54) HIGH-SPEED DIGITAL IMAGE PRINTING SYSTEM

(75) Inventor: David R. Robins, Newton, MA (US)

(73) Assignee: Intellectual Ventures I LLC, Wilmington, DE (US)

( * ) Notice: Subject to any disclaimer, the term of this patent is extended or adjusted under 35 U.S.C. 154(b) by 1559 days.

(21) Appl. No.: 10/611,737

(22) Filed: Jul. 1, 2003

(65) Prior Publication Data
US 2005/0005061 A1    Jan. 6, 2005

(51) Int. Cl.
*G06F 12/00* (2006.01)

(52) U.S. Cl.
USPC ............ 358/1.15; 358/1.1; 358/1.9; 358/300; 358/401

(58) Field of Classification Search
USPC .......... 711/104; 708/173; 358/1.5, 1.16, 1.17, 358/1.14, 1.3, 1.15, 1.8, 1.9, 404, 296, 300, 358/401, 1.13, 1.1, 104; 395/115, 133; 707/10; 713/1; 400/62; 396/56
See application file for complete search history.

(56) References Cited

U.S. PATENT DOCUMENTS

| | | | |
|---|---|---|---|
| 3,820,133 A | 6/1974 | Adorney et al. | |
| 3,864,708 A | 2/1975 | Allen | |
| 4,070,587 A | 1/1978 | Hanakata | |
| 4,072,973 A | 2/1978 | Mayo | |
| 4,089,017 A | 5/1978 | Buldini | |
| 4,154,523 A | 5/1979 | Rising et al. | |
| 4,168,120 A | 9/1979 | Freier et al. | |
| 4,284,876 A | 8/1981 | Ishibashi et al. | |
| 4,309,712 A | 1/1982 | Iwakura | |
| 4,347,518 A | 8/1982 | Williams et al. | |
| 4,364,063 A | 12/1982 | Anno et al. | |
| 4,385,302 A | 5/1983 | Moriguchi et al. | |
| 4,391,535 A | 7/1983 | Palmer | |
| 4,415,908 A | 11/1983 | Sugiura | |
| 4,443,121 A | 4/1984 | Arai | |

(Continued)

FOREIGN PATENT DOCUMENTS

| | | |
|---|---|---|
| EP | 0 204 094 | 4/1986 |
| EP | 0 619 188 | 10/1994 |

(Continued)

OTHER PUBLICATIONS

Bhukhanwala et al., "Automated Global Enhancement of Digitalized Photographs," IEEE Transactions on Consumer Electronics, Feb. 1994.

(Continued)

*Primary Examiner* — Allen H Nguyen
(74) *Attorney, Agent, or Firm* — Baker & Hostetler LLP (57) ABSTRACT

Techniques are disclosed for decreasing the time required for a photo-printing device (such as a commercial photo-printing kiosk) to print a plurality of digital images. For example, the digital images may be transferred from a print client to a print server and stored in a RAMdisk at the print server prior to printing. Image processing may be performed on at least some of the digital images prior to the initiation of printing. The digital images may be processed in decreasing order of estimated image processing time. Two or more of these techniques may be combined to decrease the total time required to print the digital images by, for example, increasing the speed with which images may be accessed, decreasing the amount of time that passes before printing begins, and enabling all of the digital images to be printed without stopping and restarting the print engine.

20 Claims, 6 Drawing Sheets

(56) References Cited

U.S. PATENT DOCUMENTS

| | | | |
|---|---|---|---|
| 4,447,818 A | 5/1984 | Kurata et al. | |
| 4,464,669 A | 8/1984 | Sekiya et al. | |
| 4,514,738 A | 4/1985 | Nagato et al. | |
| 4,524,368 A | 6/1985 | Inui et al. | |
| 4,540,992 A | 9/1985 | Moteki et al. | |
| 4,563,691 A | 1/1986 | Noguchi et al. | |
| 4,607,262 A | 8/1986 | Moriguchi et al. | |
| 4,638,372 A | 1/1987 | Leng et al. | |
| 4,686,549 A | 8/1987 | Williams et al. | |
| 4,688,051 A | 8/1987 | Kawakami et al. | |
| 4,738,526 A | 4/1988 | Larish | |
| 4,739,344 A | 4/1988 | Sullivan et al. | |
| 4,777,496 A | 10/1988 | Maejima et al. | |
| 4,805,033 A | 2/1989 | Nishikawa | |
| 4,809,063 A | 2/1989 | Moriguchi et al. | |
| 4,884,080 A | 11/1989 | Hirahara et al. | |
| 4,933,709 A | 6/1990 | Manico et al. | |
| 4,962,403 A | 10/1990 | Goodwin et al. | |
| 5,006,866 A | 4/1991 | Someya | |
| 5,045,952 A | 9/1991 | Eschbach | |
| 5,046,118 A | 9/1991 | Ajewole et al. | |
| 5,066,961 A | 11/1991 | Yamashita | |
| 5,086,306 A | 2/1992 | Sasaki | |
| 5,086,484 A | 2/1992 | Katayama et al. | |
| 5,109,235 A | 4/1992 | Sasaki | |
| 5,115,252 A | 5/1992 | Sasaki | |
| 5,130,821 A | 7/1992 | Ng | |
| 5,132,703 A | 7/1992 | Nakayama | |
| 5,132,709 A | 7/1992 | West | |
| 5,162,813 A | 11/1992 | Kuroiwa et al. | |
| 5,184,150 A | 2/1993 | Sugimoto | |
| 5,208,684 A | 5/1993 | Itoh | |
| 5,244,861 A | 9/1993 | Campbell et al. | |
| 5,248,995 A | 9/1993 | Izumi | |
| 5,268,706 A | 12/1993 | Sakamoto | |
| 5,285,220 A | 2/1994 | Suzuki et al. | |
| 5,307,425 A | 4/1994 | Otsuka | |
| 5,323,245 A | 6/1994 | Rylander | |
| 5,333,246 A * | 7/1994 | Nagasaka | 345/619 |
| 5,422,662 A | 6/1995 | Fukushima et al. | |
| 5,450,099 A | 9/1995 | Stephenson et al. | |
| 5,469,203 A | 11/1995 | Hauschild | |
| 5,479,263 A | 12/1995 | Jacobs et al. | |
| 5,497,174 A | 3/1996 | Stephany et al. | |
| 5,521,626 A | 5/1996 | Tanaka et al. | |
| 5,539,443 A | 7/1996 | Mushika et al. | |
| 5,569,347 A | 10/1996 | Obata et al. | |
| 5,576,745 A | 11/1996 | Matsubara | |
| 5,602,653 A | 2/1997 | Curry | |
| 5,617,223 A | 4/1997 | Burns et al. | |
| 5,623,297 A | 4/1997 | Austin et al. | |
| 5,623,581 A | 4/1997 | Attenberg | |
| 5,625,399 A | 4/1997 | Wiklof et al. | |
| 5,642,148 A | 6/1997 | Fukushima et al. | |
| 5,644,351 A | 7/1997 | Matsumoto et al. | |
| 5,646,672 A | 7/1997 | Fukushima | |
| 5,664,253 A | 9/1997 | Meyers | |
| 5,668,638 A | 9/1997 | Knox | |
| 5,694,484 A | 12/1997 | Cottrell et al. | |
| 5,703,644 A | 12/1997 | Mori et al. | |
| 5,706,044 A | 1/1998 | Fukushima | |
| 5,707,082 A | 1/1998 | Murphy | |
| 5,711,620 A | 1/1998 | Sasaki et al. | |
| 5,719,615 A | 2/1998 | Hashiguchi et al. | |
| 5,721,578 A | 2/1998 | Nakai et al. | |
| 5,724,456 A | 3/1998 | Boyack et al. | |
| 5,729,274 A | 3/1998 | Sato | |
| 5,757,976 A | 5/1998 | Shu | |
| 5,777,599 A | 7/1998 | Poduska, Jr. | |
| 5,781,315 A | 7/1998 | Yamaguchi | |
| 5,784,092 A | 7/1998 | Fukuoka | |
| 5,786,837 A | 7/1998 | Kaerts et al. | |
| 5,786,900 A | 7/1998 | Sawano | |
| 5,800,075 A | 9/1998 | Katsuma et al. | |
| 5,808,653 A | 9/1998 | Matsumoto et al. | |
| 5,809,164 A | 9/1998 | Hultgren, III | |
| 5,809,177 A | 9/1998 | Metcalfe et al. | |
| 5,818,474 A | 10/1998 | Takahashi et al. | |
| 5,818,975 A | 10/1998 | Goodwin et al. | |
| 5,835,244 A | 11/1998 | Bestmann | |
| 5,835,627 A | 11/1998 | Higgins et al. | |
| 5,841,461 A | 11/1998 | Katsuma | |
| 5,859,711 A * | 1/1999 | Barry et al. | 358/296 |
| 5,880,777 A | 3/1999 | Savoye et al. | |
| 5,889,546 A | 3/1999 | Fukuoka | |
| 5,896,166 A | 4/1999 | D'Alfonso et al. | |
| 5,897,254 A | 4/1999 | Tanaka et al. | |
| 5,913,019 A | 6/1999 | Attenberg | |
| 5,956,067 A | 9/1999 | Isono et al. | |
| 5,956,421 A | 9/1999 | Tanaka et al. | |
| 5,970,224 A * | 10/1999 | Salgado et al. | 358/1.16 |
| 5,978,106 A | 11/1999 | Hayashi | |
| 5,995,654 A | 11/1999 | Buhr et al. | |
| 5,999,204 A | 12/1999 | Kojima | |
| 6,005,596 A | 12/1999 | Yoshida et al. | |
| 6,028,957 A | 2/2000 | Katori et al. | |
| 6,069,637 A * | 5/2000 | Gaglione et al. | 345/629 |
| 6,069,982 A | 5/2000 | Reuman | |
| 6,104,421 A | 8/2000 | Iga et al. | |
| 6,104,468 A | 8/2000 | Bryniarski et al. | 355/18 |
| 6,104,502 A | 8/2000 | Shiomi | |
| 6,106,173 A | 8/2000 | Suzuki et al. | |
| 6,108,105 A | 8/2000 | Takeuchi et al. | |
| 6,128,099 A | 10/2000 | Delabastita | |
| 6,128,415 A | 10/2000 | Hultgren, III et al. | |
| 6,133,983 A | 10/2000 | Wheeler | |
| 6,157,459 A | 12/2000 | Shiota et al. | 358/1.15 |
| 6,172,768 B1 | 1/2001 | Yamada et al. | |
| 6,186,683 B1 | 2/2001 | Shibuki | |
| 6,204,940 B1 | 3/2001 | Lin et al. | |
| 6,208,429 B1 | 3/2001 | Anderson | 358/1.18 |
| 6,226,021 B1 | 5/2001 | Kobayashi et al. | |
| 6,233,360 B1 | 5/2001 | Metcalfe et al. | |
| 6,243,133 B1 | 6/2001 | Spaulding et al. | |
| 6,263,091 B1 | 7/2001 | Jain et al. | |
| 6,282,317 B1 | 8/2001 | Luo et al. | |
| 6,293,651 B1 | 9/2001 | Sawano | |
| 6,343,155 B1 * | 1/2002 | Chui et al. | 382/240 |
| 6,402,283 B2 | 6/2002 | Schulte | |
| 6,421,582 B1 | 7/2002 | Wada | |
| 6,425,699 B1 | 7/2002 | Doval et al. | |
| 6,447,186 B1 | 9/2002 | Oguchi et al. | |
| 6,456,388 B1 * | 9/2002 | Inoue et al. | 358/1.15 |
| 6,462,835 B1 | 10/2002 | Loushin et al. | |
| 6,501,566 B1 | 12/2002 | Ishiguro et al. | |
| 6,537,410 B2 | 3/2003 | Arnost et al. | |
| 6,563,945 B2 | 5/2003 | Holm | |
| 6,567,111 B2 | 5/2003 | Kojima et al. | |
| 6,606,602 B1 | 8/2003 | Kolls | |
| 6,608,926 B1 | 8/2003 | Suwa | |
| 6,614,459 B2 | 9/2003 | Fujimoto et al. | |
| 6,628,417 B1 * | 9/2003 | Naito et al. | 358/1.15 |
| 6,628,823 B1 | 9/2003 | Holm | |
| 6,628,826 B1 | 9/2003 | Gilman et al. | |
| 6,628,899 B1 * | 9/2003 | Kito | 396/56 |
| 6,650,771 B1 | 11/2003 | Walker | |
| 6,661,443 B2 | 12/2003 | Bybell et al. | |
| 6,671,063 B1 | 12/2003 | Iida | |
| 6,690,488 B1 | 2/2004 | Reuman | |
| 6,694,051 B1 | 2/2004 | Yamazoe et al. | |
| 6,711,285 B2 | 3/2004 | Noguchi | |
| 6,760,489 B1 | 7/2004 | Kuwata | |
| 6,762,855 B1 * | 7/2004 | Goldberg et al. | 358/1.5 |
| 6,784,925 B1 | 8/2004 | Tomat et al. | |
| 6,789,879 B2 * | 9/2004 | Khalid | 347/43 |
| 6,819,347 B2 | 11/2004 | Saquib et al. | |
| 6,826,310 B2 | 11/2004 | Trifonov et al. | |
| 6,833,861 B2 | 12/2004 | Matsumoto et al. | |
| 6,906,736 B2 | 6/2005 | Bouchard et al. | |
| 6,937,365 B2 | 8/2005 | Gorian et al. | |
| 6,956,967 B2 | 10/2005 | Gindele et al. | |
| 6,999,202 B2 | 2/2006 | Bybell et al. | |
| 7,050,194 B1 * | 5/2006 | Someno et al. | 358/1.9 |
| 7,051,328 B2 * | 5/2006 | Rai et al. | 718/102 |

(56) References Cited

U.S. PATENT DOCUMENTS

| | | | |
|---|---|---|---|
| 7,129,980 B1 | 10/2006 | Ashida | |
| 7,154,630 B1 | 12/2006 | Nimura et al. | |
| 7,167,597 B2 | 1/2007 | Matsushima | |
| 7,200,265 B2 | 4/2007 | Imai | |
| 7,224,476 B2* | 5/2007 | Yoshida | 358/1.14 |
| 7,272,390 B1 | 9/2007 | Adachi et al. | |
| 7,283,666 B2 | 10/2007 | Saquib | |
| 7,355,732 B2 | 4/2008 | Yamaguchi | |
| 7,548,260 B2 | 6/2009 | Yamaguchi | |
| 7,907,157 B2 | 3/2011 | Bouchard et al. | |
| 7,917,862 B2 | 3/2011 | Breidenbach et al. | |
| 2002/0012134 A1* | 1/2002 | Calaway | 358/1.18 |
| 2002/0034392 A1* | 3/2002 | Baum et al. | 396/564 |
| 2002/0049837 A1* | 4/2002 | Kato | 709/223 |
| 2002/0122588 A1* | 9/2002 | Yamamoto | 382/167 |
| 2002/0135794 A1 | 9/2002 | Rodriguez et al. | 358/1.15 |
| 2002/0191066 A1 | 12/2002 | Bouchard et al. | 347/172 |
| 2003/0021478 A1* | 1/2003 | Yoshida | 382/195 |
| 2003/0068084 A1* | 4/2003 | Kinjo et al. | 382/164 |
| 2003/0095282 A1* | 5/2003 | Suzuki et al. | 358/1.15 |
| 2004/0073783 A1* | 4/2004 | Ritchie | 713/1 |
| 2004/0179226 A1* | 9/2004 | Burkes et al. | 358/1.15 |
| 2004/0207712 A1 | 10/2004 | Bouchard et al. | |
| 2005/0069107 A1* | 3/2005 | Tanaka et al. | 379/93.17 |
| 2005/0117948 A1* | 6/2005 | Hatta et al. | 400/62 |
| 2005/0219344 A1 | 10/2005 | Bouchard | |
| 2007/0036457 A1 | 2/2007 | Saquib | |
| 2009/0128613 A1 | 5/2009 | Bouchard et al. | |

FOREIGN PATENT DOCUMENTS

| | | | |
|---|---|---|---|
| EP | 0 625 425 | 11/1994 | |
| EP | 0 626 611 | 11/1994 | |
| EP | 0 454 495 | 7/1996 | |
| EP | 0 791 472 | 2/1997 | |
| EP | 0 762 736 | 3/1997 | |
| EP | 0 773 470 | 5/1997 | |
| EP | 0 939 359 A2 | 8/1998 | G06F 3/06 |
| EP | 0 939 359 A3 | 8/1998 | G06F 3/06 |
| EP | 0 933 679 A2 | 8/1999 | G03D 15/00 |
| EP | 0 933 679 A3 | 8/1999 | G03D 15/00 |
| EP | 1 004 442 | 5/2000 | |
| EP | 1 056 272 | 11/2000 | |
| EP | 1 137 247 A2 | 1/2001 | H04N 1/00 |
| EP | 1 137 247 A3 | 1/2001 | H04N 1/00 |
| EP | 1 078 750 | 2/2001 | |
| EP | 1 137 247 | 9/2001 | |
| EP | 1 201 449 | 10/2001 | |
| EP | 1 392 514 | 9/2005 | |
| GB | 2 356 375 | 5/2001 | |
| JP | 58-164368 | 9/1983 | |
| JP | 59-127781 | 7/1984 | |
| JP | 01 040371 | 2/1989 | |
| JP | 02-248264 | 10/1990 | |
| JP | 02-289368 | 11/1990 | |
| JP | 03-024972 | 2/1991 | |
| JP | 4-119338 | 4/1992 | |
| JP | 06 183033 | 7/1994 | |
| JP | 6-266514 | 9/1994 | G06F 3/12 |
| JP | 06-266514 A2 | 9/1994 | G06F 3/12 |
| JP | 6-308632 | 11/1994 | |
| JP | 9-138465 | 5/1997 | |
| JP | 9-167129 | 6/1997 | G06F 13/00 |
| JP | 09167129 A | 6/1997 | G06F 13/00 |
| JP | 2000-050077 | 2/2000 | |
| JP | 2000-050080 | 2/2000 | |
| JP | 2000-184270 | 6/2000 | |
| JP | 2001-160908 | 6/2001 | |
| JP | 2001-273112 | 10/2001 | G06F 3/12 |
| JP | 2001273112 A | 10/2001 | G06F 3/12 |
| JP | 2003-008986 | 1/2003 | |
| KR | 2001-0037684 | 5/2001 | |
| WO | 99/53415 | 10/1999 | G06F 17/00 |
| WO | WO 00/04492 | 1/2000 | |
| WO | WO 01/01669 | 1/2001 | |
| WO | 01/31432 A1 | 5/2001 | G06F 3/12 |
| WO | WO 02 078320 | 10/2002 | |
| WO | WO 02/096651 | 12/2002 | |
| WO | WO 03/071780 | 8/2003 | |
| WO | WO 2004/077816 | 9/2004 | |
| WO | WO 2005 006200 | 1/2005 | |

OTHER PUBLICATIONS

Damera-Venkata et al., "Adaptive Threshold Modulation for Error Diffusion Halftoning," IEEE Trans. on Image Processing, 2001, 10(1), 104-116.

Gonzalez et al., "Digital Image Processing," Addison-Wesley, 1977, 119-126.

Hann, R.A. et al., "Chemical Technology in Printing and Imaging Systems", *The Royal Society of Chemistry, , Special Publication*. 133 (1993), pp. 73-85.

Hann, R.A. et al., "Dye Diffusion Thermal Transfer (D2T2) Color Printing", *Journal of Imaging Technology.*, 16 (6). (1990), pp. 238-241.

Kearns et al., "Algorithmic Stability and Sanity-Check Bounds for Leave-One-Out Cross-Validation," XP-002299710, Jan. 1997, 1-20.

Knox et al., "Threshold Modulation in Error Diffusion," SPIE, 1993, 2(3), 185-192.

Taguchi et al., "New Thermal Offset Printing Employing Dye Transfer Technology (Tandem TOP-D)," *NIP17: International Conference on Digital Printing Technologies*, Sep. 2001, vol. 17, pp. 499-503.

Pratt, W.K., "Digital Image Processing," Wiley & Sons, 1978, 311-318.

Ulichney, R., "Digital Halftoning," Cambridge, MA, MIT Press, (1987), Chapters 5 and 6, pp. 239-319 p. 341.

Weston et al., "Adaptive Margin Support Vector Machines," Advances in Large Margin Classifiers, 2000, 281-296.

Wong, P.W., "Adaptive Error Diffusion and Its Application in Multiresolution Rendering," IEEE Trans. on Image Processing, 1996, 5(7), 1184-1196.

United States Patent and Trademark Office: Restriction Requirement dated Sep. 30, 2003, U.S. Appl. No. 10/078,644, filed Feb. 19, 2002.

United States Patent and Trademark Office: Restriction Requirement dated Oct. 2, 2003, U.S. Appl. No. 10/080,883, filed Feb. 2, 2002.

United States Patent and Trademark Office: Non-Final Office Action dated Mar. 29, 2004, U.S. Appl. No. 10/080,883, filed Feb. 22, 2002.

United States Patent and Trademark Office: Non-Final Office Action dated Sep. 22, 2004, U.S. Appl. No. 10/078,644, filed Feb. 19, 2002.

United States Patent and Trademark Office: Notice of Allowance dated Sep. 23, 2004, U.S. Appl. No. 10/080,883, filed Feb. 22, 2003.

United States Patent and Trademark Office: Non-Final Office Action dated Nov. 29, 2004, U.S. Appl. No. 09/817,932, filed Mar. 27, 2001.

United States Patent and Trademark Office: Non-Final Office Action dated Nov. 29, 2004, U.S. Appl. No. 09/870,537, filed May 30, 2001.

United States Patent and Trademark Office: Notice of Allowance dated Feb. 22, 2005, U.S. Appl. No. 10/078,644, filed Feb. 19, 2002.

United States Patent and Trademark Office: Notice of Allowance dated May 9, 2005, U.S. Appl. No. 09/870,537, filed May 30, 2001.

United States Patent and Trademark Office: Notice of Allowance dated Aug. 31, 2005, U.S. Appl. No. 09/817,932, filed Mar. 27, 2001.

United States Patent and Trademark Office: Non-Final Office Action dated Jul. 13, 2006, U.S. Appl. No. 10/375,440, filed Feb. 27, 2003.

United States Patent and Trademark Office: Final Office Action dated Dec. 4, 2006, U.S. Appl. No. 10/375,440, filed Feb. 27, 2003.

United States Patent and Trademark Office: Notice of Allowance dated May 29, 2007, U.S. Appl. No. 10/375,440, filed Feb. 27, 2003.

United States Patent and Trademark Office: Restriction Requirement dated Sep. 4, 2007, U.S. Appl. No. 10/844,286, filed May 12, 2004.

United States Patent and Trademark Office: Notice of Allowance dated Sep. 6, 2007, U.S. Appl. No. 10/375,440, filed Feb. 27, 2003.

United States Patent and Trademark Office: Non-Final Office Action dated Nov. 14, 2007, U.S. Appl. No. 10/844,286, filed May 12, 2004.

United States Patent and Trademark Office: Non-Final Office Action dated Mar. 20, 2008, U.S. Appl. No. 10/844,286, filed May 12, 2005.

United States Patent and Trademark Office: Final Office Action dated Sep. 12, 2008, U.S. Appl. No. 10/844,286, filed May 12, 2004.

(56) References Cited

OTHER PUBLICATIONS

United States Patent and Trademark Office: Restriction Requirement dated Oct. 8, 2008, U.S. Appl. No. 11/546,633, filed Oct. 12, 2006.
United States Patent and Trademark Office: Non-Final Office Action dated Jan. 30, 2009, U.S. Appl. No. 11/546,633, filed Oct. 12, 2006.
United States Patent and Trademark Office: Non-Final Office Action dated May 21, 2009, U.S. Appl. No. 10/844,286, filed May 12, 2004.
United States Patent and Trademark Office: Restriction Requirement dated May 26, 2009, U.S. Appl. No. 11/546,633, filed Oct. 12, 2006.
United States Patent and Trademark Office: Final Office Action dated Jul. 9, 2009, U.S. Appl. No. 11/546,633, filed Oct. 12, 2006.
United States Patent and Trademark Office: Non-Final Office Action dated Jul. 31, 2009, U.S. Appl. No. 12/031,151, filed Feb. 14, 2008.
United States Patent and Trademark Office: U.S. Appl. No. 11/847,894, filed Aug. 30, 2007, Gorian et al.
United States Patent and Trademark Office: U.S. Appl. No. 12/031,151, filed Feb. 14, 2008, Bybell.
International Preliminary Examination Report (IPER) dated Jun. 30, 2003, PCT/US02/015546.
EP Communication issued by the Examining Division Apr. 2, 2004, EP1392514.
International Preliminary Examination Report (IPER) issued Sep. 2, 2005, PCT/US04/004964.
EP Communication issued by the Examining Division Jan. 11, 2006, EP1597911.
EP Communication issued by the Examining Division May 23, 2006, EP1597911.
International Preliminary Examination Report (IPER) issued Jan. 3, 2006, PCT/USO4/020981.
International Preliminary Examination Report (IPER) dated Sep. 17, 2003, PCT/US02/015913.
EP Communication issued by the Examining Division May 29, 2009, EP1479220.
International Preliminary Examination Report (IPER) dated Jan. 29, 2003, PCT/US02/008954.
EP Communication issued by the Examining Division Jul. 7, 2009, EP1374557.

\* cited by examiner

HIGH-SPEED DIGITAL IMAGE PRINTING SYSTEM

CROSS-REFERENCE TO RELATED APPLICATIONS

This application is related to U.S. patent application Ser. No. 10/080,883, filed on Feb. 22, 2002, entitled "A High-Speed Photo-Printing Apparatus," which is hereby incorporated by reference.

BACKGROUND

1. Field of the Invention

The present invention relates to techniques for printing digital images and, more particularly, to techniques for increasing efficiency of printing in a digital image printing system.

2. Related Art

Digital photography is becoming increasingly popular and is generating a demand for increasingly easy, quick, and inexpensive ways to obtain prints of digital photographs. The options that currently are available to amateur users of digital cameras for obtaining prints, however, have certain limitations.

For example, a user who has digital photographs stored in a digital camera may print the photographs on a home printer, either by first transferring the photographs from the digital camera to a computer using a wired or wireless connection and then printing the photographs from the computer to the printer, or by inserting the digital camera's memory card directly into the printer and instructing the printer to print one or more of the photographs. In either case, printing on a home printer may be suboptimal for any of several reasons. First, the speed of home printers is typically limited, often requiring one or more minutes to print a single photo-quality 4"×6" image. Printing a set of images from a vacation or other event may therefore require an hour or more. Furthermore, photo-quality images require a significant amount of ink to print. As a result, the user may be required to purchase many ink cartridges and to replace them frequently. Moreover, the user interface of the computer and/or printer may make it difficult to select and print the desired images, particularly if multiple copies are desired or if the user desires to print images on paper of varying sizes. Finally, the inkjet technologies that are used in most home printers produce images that are susceptible to fading after a relatively short period of time.

The home user may alternatively obtain prints from a commercial printing service. For example, the user may transfer digital photographs over the Internet to a service that prints the desired images, charges the user a fee, and sends the resulting prints to the user through the postal mail. Although prints obtained in this manner typically are of higher quality than can be obtained using a home printer, Internet photo-printing services can have certain drawbacks. For example, transferring large numbers of high-quality digital images to an Internet photo-printing service can take several hours over the 56K modem connection that is still used by most home users. Furthermore, transferring digital photographs to the computer so that they may be uploaded to the photo-printing service requires additional time and effort, as well as a degree of computer proficiency that home users may not have. In addition, the use of postal mail as the delivery mechanism means that the user must both pay an additional fee for postage and wait at least several days to receive prints.

An increasing number of walk-in photo development businesses are providing digital photo-printing services. To obtain prints using such a service, the user provides the service with the storage medium (e.g., memory card) from the user's digital camera and indicates which photographs are to be printed. The service prints the selected photographs and provides them to the user for a fee. Although such a service eliminates the problems associated with the use of postal mail delivery, problems remain. For example, the user may be required to wait a substantial period of time (such as an hour or a day) to receive the desired prints. As a result, the user may either need to wait at the store or make a return trip to pick up the prints. Furthermore, the service may not provide the user with the ability to preview photographs before they are printed, thereby making it difficult for the user to select the correct photographs to print. It may also be difficult or impossible for the user to select individual options for each photograph, such as the print size and image processing to be applied (e.g., red-eye reduction or contrast correction).

Digital photo-printing kiosks have been introduced in recent years in part as an attempt to address the problems described above. Such a kiosk is a self-contained device that includes a printer, a computer (including a display screen visible to the user), and one or more readers for reading digital images from storage media. A user may approach such a kiosk, insert a storage medium from a digital camera, use a graphical user interface to select one or more images to print, provide payment (such as by inserting a credit card), and then instruct the kiosk to print the selected images. The kiosk then prints the selected images and dispenses them to the user.

Such kiosks can be advantageous to the extent that they provide the user with a quick, easy, and flexible way in which to select, pay for, and obtain high-quality prints. Existing photo-printing kiosks, however, still tend to print at relatively slow speeds, often requiring thirty seconds or more to print a single photograph. As a result, a user who wishes to print a reasonable number of photographs may need to wait at the kiosk for a substantial period of time before all of the prints are complete.

Techniques that may be used to implement a high-speed photo-printing kiosk are disclosed in the above-referenced patent application entitled "A High-Speed Photo-Printing Apparatus." Such a kiosk may, for example, include a print mechanism that has a throughput of 1-2 photo-quality images per second once the mechanism begins printing. Starting and stopping the print mechanism, however, takes time. If the print mechanism has finished printing one image and another image is not available to be printed, the print mechanism must be stopped and then restarted when the next image becomes available to print. Therefore, when using such a print mechanism to print a set of digital images, it is desirable to provide the images to the print mechanism in a manner which increases the likelihood that upon completion of printing an image, a subsequent image will be available to the print mechanism for printing. Providing images to the print mechanism in this manner would maximize the number of images that could be printed successively by the print mechanism and thereby minimize the time between the beginning and end of printing. In addition, it is desirable to begin printing as soon as possible after the user has issued a print command, so that the total printing time may be minimized.

For the foregoing reasons, there is a need for techniques for reducing the total time required to print digital images in a digital image printing system.

SUMMARY

Techniques are disclosed for decreasing the time required for a photo-printing device (such as a commercial photo-printing kiosk) to print a plurality of digital images. For example, the digital images may be transferred from a print client to a print server and stored in a RAMdisk at the print server prior to printing. Image processing may be performed on at least some of the digital images prior to the initiation of printing. The digital images may be processed in decreasing order of estimated image processing time. Two or more of these techniques may be combined to decrease the total time required to print the digital images by, for example, increasing the speed with which images may be accessed, decreasing the amount of time that passes before printing begins, and enabling all of the digital images to be printed without stopping and restarting the print engine.

For example, in one aspect of the present invention, a computer-implemented method is provided for printing a plurality of digital images. The method includes steps of: (A) transmitting the plurality of digital images over a communications bus; (B) receiving the plurality of images over the communications bus; (C) storing the plurality of digital images in a RAMdisk in the order in which the plurality of digital images are to be printed; (D) retrieving the plurality of digital images from the RAMdisk in the order in which the plurality of digital images are to be printed; (E) at the print server, deleting the plurality of digital images after they are retrieved from the RAMdisk; and (F) at the print server, printing the plurality of digital images on output media using a print engine without stopping and restarting the print engine.

In another aspect of the present invention, a computer-implemented method is provided for printing a plurality of digital images. The method includes steps of: (A) estimating amounts of time required to perform image processing on each of the plurality of digital images; (B) selecting an order in which to perform image processing on at least some of the plurality of digital images based on the estimates made in step (A); (C) performing image processing on at least some of the plurality of digital images in the order selected in step (B) to produce a plurality of processed images; (D) transmitting the plurality of processed images to the server over a communications bus; (E) at a print server, storing the plurality of processed images in a RAMdisk in the order in which the plurality of processed images are to be printed; (F) at the print server, retrieving the plurality of processed images from the RAMdisk in the order in which the plurality of processed images are to be printed; and (G) at the print server, printing the plurality of processed images on output media using a print engine without stopping and restarting the print engine.

In yet another aspect of the present invention, a computer-implemented method is provided for printing a plurality of digital images. The method includes steps of: (A) identifying a subset of the plurality of digital images having estimated processing times not less than a first predetermined threshold; (B) performing image processing on at least some of the images in the subset to produce a first plurality of processed images; (C) transmitting the first plurality of processed images to a print server over a communications bus; (D) after the step (A), activating a print engine to print the first plurality of processed images; (E) printing the first plurality of processed images using the print engine; (F) performing image processing on a second set of images including fewer than all of the digital images to produce a second plurality of processed images; and (G) at the print server, printing the second plurality of processed images without stopping and reactivating the print engine.

Other features and advantages of various aspects and embodiments of the present invention will become apparent from the following description and from the claims.

DETAILED DESCRIPTION

Techniques are disclosed for decreasing the time required for a photo-printing device (such as a commercial photo-printing kiosk) to print a plurality of digital images. For example, the digital images may be transferred from a print client to a print server and stored in a RAMdisk at the print server prior to printing. Image processing may be performed on at least some of the digital images prior to the initiation of printing. The digital images may be processed in decreasing order of estimated image processing time. Two or more of these techniques may be combined to decrease the total time required to print the digital images by, for example, increasing the speed with which images may be accessed, decreasing the amount of time that passes before printing begins, and enabling all of the digital images to be printed without stopping and restarting the print engine.

Figure 1:
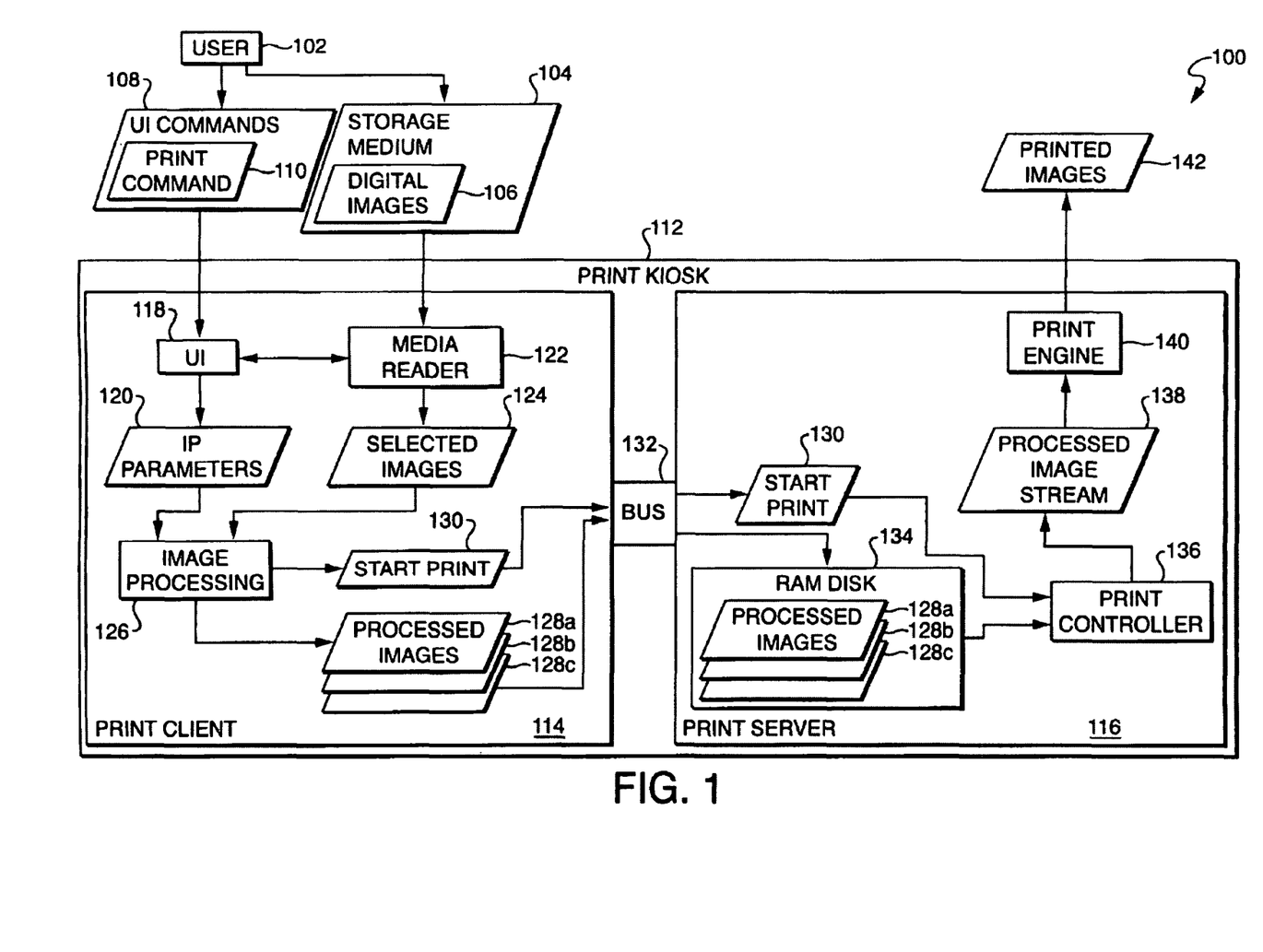
FIG. 1 is a block diagram of a photo-printing system according to one embodiment of the present invention.
Figure 2:
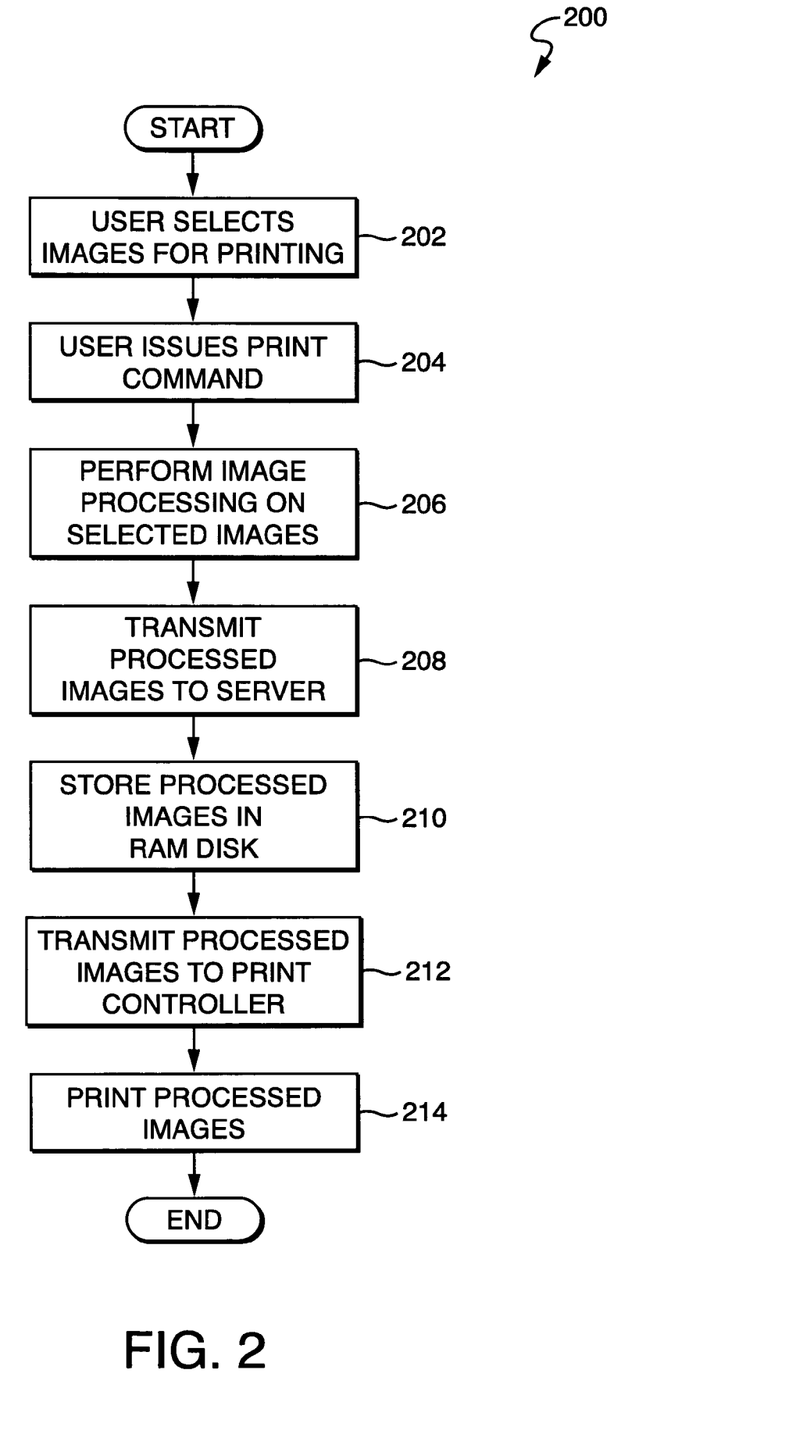
FIG. 2 is a flowchart of a method that is performed by the system of FIG. 1 to print digital images according to one embodiment of the present invention.

Referring to FIG. 1, a block diagram of a photo-printing system 100 is shown according to one embodiment of the present invention. Various techniques that may be implemented in accordance with embodiments of the present invention will be described with respect to the system 100 shown in FIG. 1. Referring to FIG. 2, a flowchart is shown of a method 200 that is performed by the system 100 of FIG. 1 to print digital images according to one embodiment of the present invention.

The system 100 includes a print kiosk 112. Examples of the physical features and general operation of the print kiosk 112 are described in more detail in the above-referenced patent application entitled "A High-Speed Photo-Printing Apparatus." The kiosk 112 may, for example, take the form of a vending machine suitable for standalone operation by a lay user 102 at a convenience store or other commercial location. The kiosk 112 may include both a print client 114 and a print server 116. Although the functions performed by the client 114 and server 116 will be described in more detail below, in general the client 114 may be implemented as a first computer whose primary function is to receive and process images from the user 102, and the server 116 may be implemented as a second computer whose primary function is to receive and print processed images from the client 114. The client 114 may, for example, be a computer running the Microsoft® Windows® 2000 operating system, having an Intel® Pentium® 4 processor with a clock speed of 1.6-1.8 GHz, and having 512 MB of RAM. The server 116 may, for example, be a computer running the Linux® operating system, have an Intel® Pentium® 4 processor with a clock speed of 1.6-1.8 GHz, and having 256 MB of RAM.

The user 102 may have a storage medium 104 (such as a memory card or CD) containing one or more digital images 106, such as digital photographs captured using a digital camera. The user 102, desiring to obtain prints of one or more of the digital images 106, may approach the kiosk 112 and insert the storage medium 104 into a media reader 122 in the print client 114. The media reader 122 may include slots for receiving and reading from various kinds of storage media.

The user 102 may then select one or more of the digital images 106 for printing (step 202). The print client 114 may, for example, include a user interface 118 that performs functions such as displaying thumbnails of the digital images 106 to the user 102 on a display screen (not shown), allowing the user 102 to select particular ones of the digital images 106 for printing, and displaying the total printing price. The user 102 issues commands 108 to the user interface 118 using an input device (not shown), such as a touch screen, trackball, mouse, and/or keyboard in the print client 114.

As shown in FIG. 1, the media reader 122 may read the selected images 124 from the storage medium 104 and store the selected images 124 locally in the print client 114. For example, the selected images 124 may be stored in a hard disk drive (not shown) in the client 114. Although the media reader 122 may read the selected images 124 from the storage medium 104 as they are selected by the user 102, alternatively the media reader 122 may read all of the digital images 106 from the storage medium 104 when the user 102 inserts the storage medium 104 in the media reader 122. All of the digital images 106 may then be stored locally in the print client 114. When the user 102 subsequently selects particular ones of the digital images 106, the selected images 124 may be marked to distinguish them from the remaining (unselected) ones of the digital images 106. Typically it is more efficient to read all of the digital images 106 from the storage medium 104 in this manner than to read individual ones of the digital images 106 as they are selected by the user 102.

The user 102 may also instruct the print client 114 to perform various kinds of image processing on the selected images 124 prior to printing them. For example, the user interface 118 may allow the user to indicate that red-eye reduction, contrast correction, and brightness correction be performed on one or more of the selected images 124 prior to printing them. The user interface 118 produces image processing parameters 120 specifying the particular kinds of image processing to be performed on the digital images 106.

The user 102 issues a print command 110 to the print client 114 upon selecting all images desired to be printed (step 204). The user 102 may issue the print command 110 by, for example, selecting an on-screen "print" button. The user 102 may also be required to provide payment at this time, such as by inserting a credit/debit card into a card reader (not shown) in the print client 114. Techniques for completing the payment portion of the transaction are well-known to those of ordinary skill in the art and will not be described in detail herein.

The image processing parameters 120 and selected images 124 may be produced in response to the user's issuance of the print command 110. The image processing parameters 120 and selected images 124 may be provided to an image processing unit 126, which performs image processing on the selected images 124 as specified by the image processing parameters 120 (step 206). The image processing unit 126 may also perform additional image processing not specified by the image processing parameters 120. For example, the image processing unit 126 may resize all of the selected images 124 to fit the size of the output medium and perform thermal history control on the selected images 124.

The image processing unit 126 produces processed images 128a-c as a result of performing image processing on the selected images 124. The processed images 128a-c may, for example, be stored in files on a hard disk drive (not shown) in the print client 114.

The client 114 transmits the processed images 128a over a communications bus 132 to the print server 116 (step 208), where the processed images 128a-c are stored in a RAMdisk 134 (step 210). The communications bus 132 may, for example, be a fast (gigabit) Ethernet connection between the client 114 and server 116. As is well-known to those of ordinary skill in the art, a RAMdisk is a portion of volatile memory (e.g., RAM) that may be accessed using the same interface as a persistent storage device, such as a hard disk drive. RAMdisk 134 thereby emulates the file system of a persistent storage device while retaining the fast access speed of volatile memory. In one embodiment of the present invention, the RAMdisk 134 is 128 Mbytes large, thereby allowing it to store up to 16 4"×6" KIF (Knowledge Interchange Format) images.

The print server 116 includes a print controller 136 that transmits the processed image files 128a-c from the RAMdisk 134 to a print engine 140 in the print server 116 (step 212). The print controller 136 may, for example, transmit one of the processed images 128a-c at a time to the print engine 140 in a stream 138 in the order in which the processed images 128a-c were processed and stored in the RAMdisk 134, so that the RAMdisk 134 is used as a FIFO (first-in first-out) queue for the processed images 128a-c. Individual ones of the processed images 128a-c may be deleted from the RAMdisk 134 after they are transmitted to the print engine 140 for printing. The print engine 140 prints the processed images, thereby producing printed images 142 (step 214).

The term "print engine" is used herein to refer generally to the components within the print server 116 that are responsible for physically printing the processed images 128a-c and thereby to produce printed images 142. The printed images 142 may, for example, take the form of 4"×6" printed photographs that are provided to the user 102.

Figure 3:
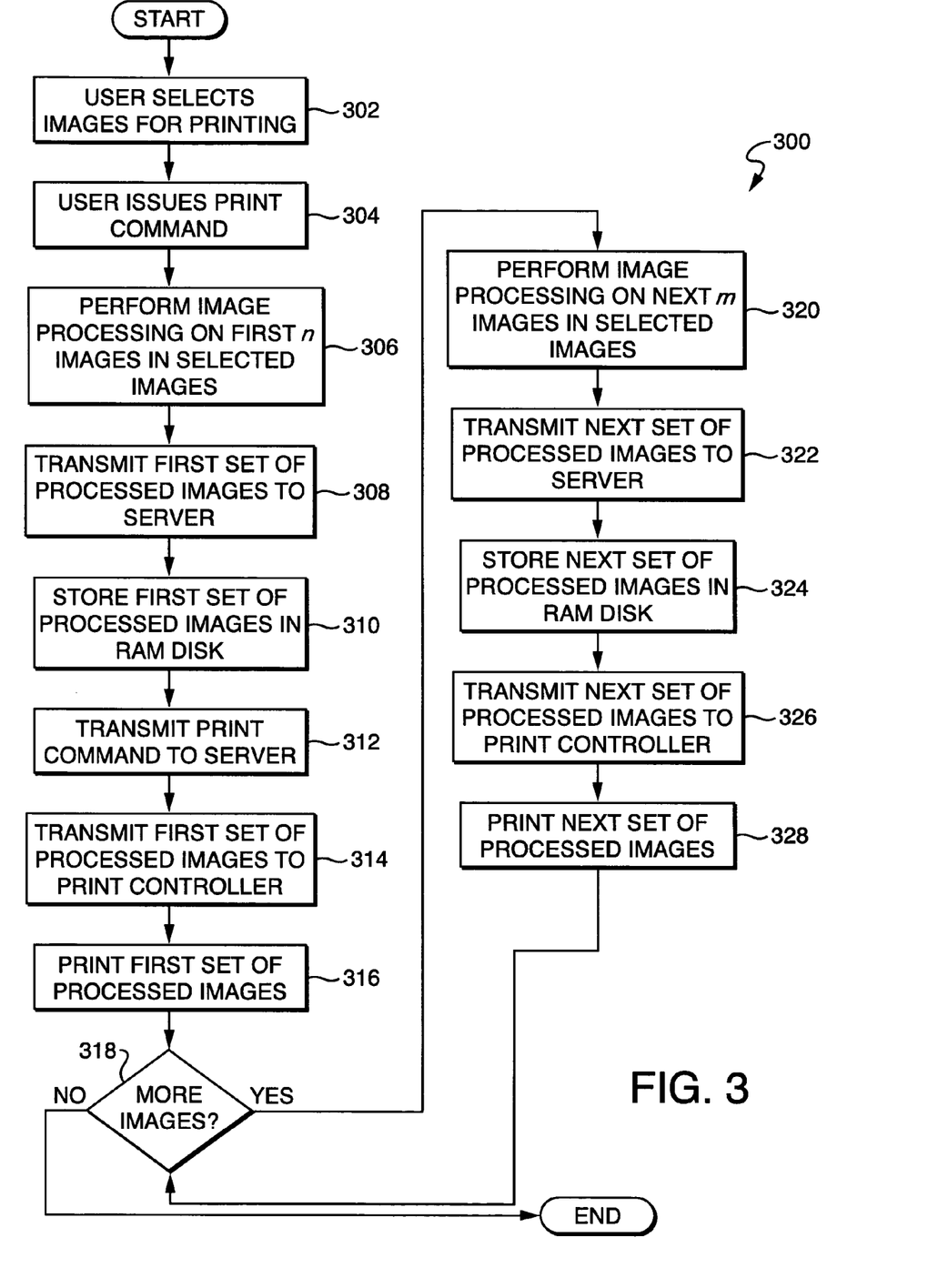
FIG. 3 is a flowchart of a method that is used in one embodiment of the present invention to print images selected by the user in the system of FIG. 1.

In various embodiments of the present invention, the selected images 124 are processed and transmitted to the print server 116 in a manner that is intended to decrease the total time required to print the selected images 124. Examples of techniques will now be described for processing at least some of the selected images 124 prior to the initiation of printing, and for maintaining a sufficient flow of image data from the client 114 to the server 116 to ensure (or at least increase the likelihood) that the print server 116 will be able to print all of the selected images 124 without stopping and restarting the print engine 140. Referring to FIG. 3, a flowchart is shown of a method 300 that is used in one embodiment of the present invention to print the selected images 124 in this manner.

The user 102 selects images for printing (step 302) and issues the print command 110 (step 304), as described above with respect to steps 202-204 of method 200 (FIG. 2). In response to issuance of the print command 110, the image processing unit 126 performs image processing on the first n images in the set of selected images 124, thereby producing a first set of processed images 128a (step 306). If there are fewer than n images in the set of selected images 124, the image processing unit 126 processes all of the selected images 124.

The value of n may be selected in any of a variety of ways. For example, the value of n may be selected using empirical testing of the print kiosk 112 by trying different values of n with various sets of selected images, and selecting a value of n that enables the print client 114 to keep up with the print server 116 in all or an acceptable number of cases. The value of n may then be fixed for all print jobs. Alternatively, a different value of n may be selected for each print job using an appropriate formula or algorithm.

Figure 6:
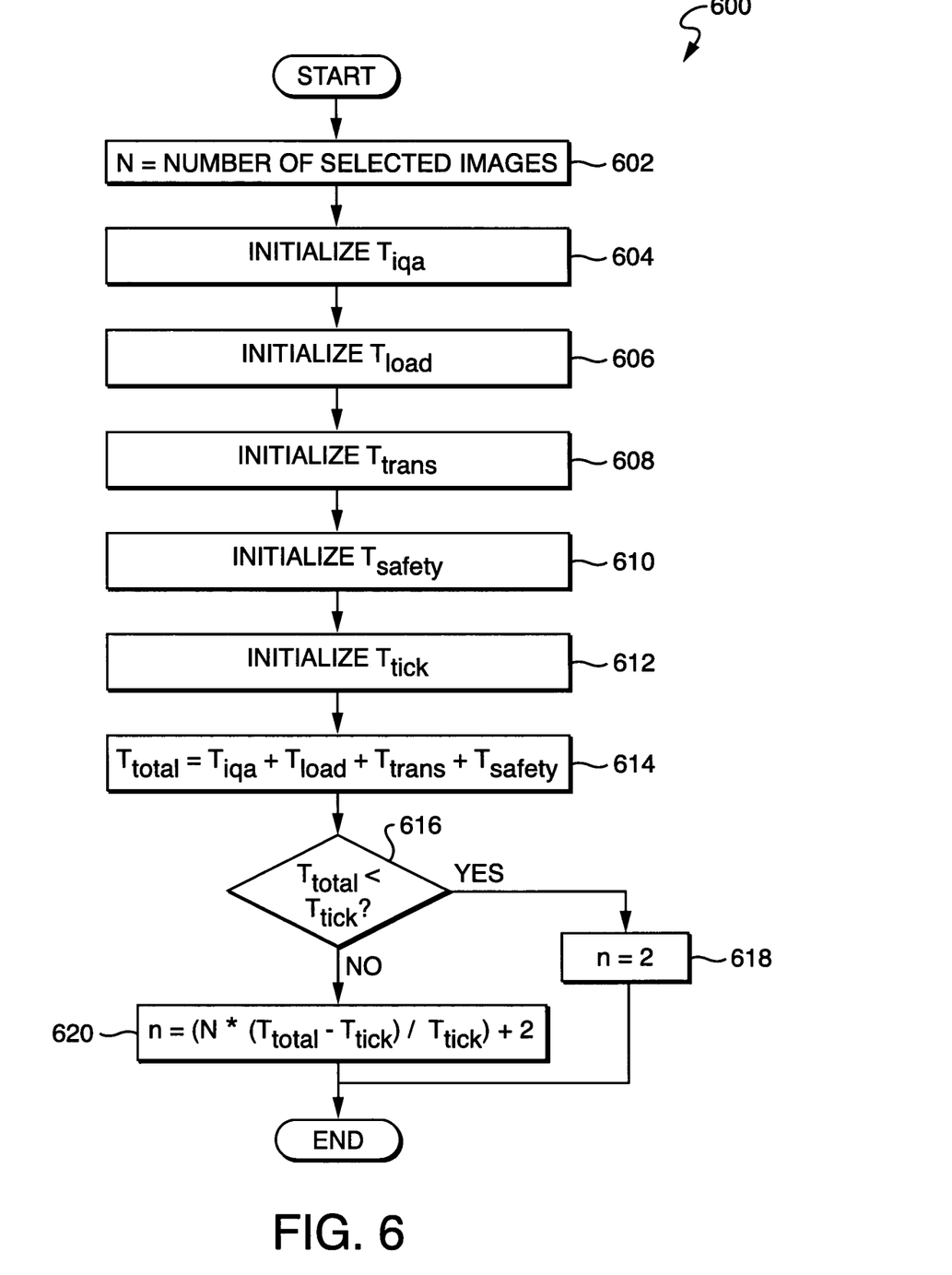
FIG. 6 is a flowchart of a method for selecting the number of images to transfer from a print client to a print server prior to the initiation of printing according to one embodiment of the present invention.

Referring to FIG. 6, a flowchart is shown of a method 600 that is used in one embodiment of the present invention to select a value for n. Let N be the total number of images to print (e.g., the total number of selected images 124). Let $T_{iqa}$ be an estimate of the time required to perform image processing on one of the selected images 124. A value of $T_{iqa}$ may be selected, for example, by processing a set of test images, measuring the actual time required to process each of the test images, and using the average processing time as the value of $T_{iqa}$. Let $T_{load}$ be an estimate of the time required to load one of the selected images 124 from the hard disk. A value of $T_{load}$ may similarly be selected as the average observed load time of a set of test images.

Let $T_{trans}$ be an estimate of the time required to transfer a single image from the print client 114 to the print server 116. In one embodiment of the present invention, $T_{trans}$=200 msec. Let $T_{safety}$ be a safety margin, such as 100 msec. Let $T_{tick}$ be the system tick time, which indicates the minimum amount of time in which the print engine 140 can print a single image. In one embodiment of the present invention, for example, $T_{tick}$=2 seconds. The method 600 initializes the values of N, $T_{iqa}$, $T_{load}$, $T_{trans}$, $T_{safety}$, and $T_{tick}$ to appropriate values (FIG. 6, steps 602-612).

Let $T_{total}$ be an estimate of the total minimum time required to print a single image, beginning from the time at which the image begins to be read from the storage (e.g., the hard disk drive) in the client 114 and ending with the completion of printing by the print engine 140. In one embodiment of the present invention, the method 600 calculates the value of $T_{total}$ using Equation 1 (step 614):

$$T_{total}=T_{iqa}+T_{load}+T_{trans}+T_{safety} \quad \text{Equation 1}$$

If $T_{total}<T_{tick}$ (step 616), the method 600 assigns a value of 2 to n (step 618). Otherwise (i.e., if $T_{total} \geq T_{tick}$), the method 600 assigns a value to n using Equation 2 (step 620):

$$n=(N*(T_{total}-T_{tick})/T_{tick})+2 \quad \text{Equation 2}$$

Assume, for example, that N=124 images, $T_{iqa}$=1.4 seconds, $T_{load}$=0.4 seconds, $T_{trans}$=0.2 seconds, and $T_{safety}$=0.2 seconds. Using Equation 1, $T_{total}$=2.2 seconds. Since $T_{total} \geq T_{tick}$ (step 616), the value of n is selected using Equation 2 (step 620). Applying Equation 2:

$$n=(124*(2.2-2.0)/2.0)+2$$

$$(124*0.2/2.0)+2$$

$$(24.8/2.0)+2$$

$$12.4+2$$

$$14.4$$

Rounding to the nearest integer, n=14 in the present example. Therefore, the first 14 of the processed images 128a-c images would be transferred by the print client 114 to the print server 116 prior to transmission of the start print command 130 by the client 114 to the server 116.

In the present embodiment, the print server 116 does not begin printing images until the image processing unit 126 produces the first set of n processed images 128a. More specifically, after producing the first set of processed images 128a, the image processing unit 126 transmits the first set of processed images 128a over the communications bus 132 to the print server 116 (step 308), where the set of images 128a is stored in the RAMdisk 134 (step 310).

Once the first set of processed images 128a is stored in the RAMdisk 134, the image processing unit 126 (or other component within the client 114) transmits a start print command 130 to the print server 116 over communications bus 132 (step 312). The start print command 130 is received by print controller 136 in the print server 116. In response to receiving the start print command 130, the print controller 136 begins transmitting processed image files from the RAMdisk 134 to a print engine 140 in the print server 116 (step 314). As a result the print engine 140 prints the first set of processed images 128a in the order in which they were transmitted and stored in the RAMdisk 134 (step 316).

Preprocessing at least some of the selected images 124 prior to the initiation of printing decreases the amount of image processing that needs to be performed after the initiation of printing, thereby increasing the likelihood that the client 114 will be able to keep up with the server 116 after printing begins. As a result, preprocessing at least some of the selected images 124 before beginning to print is one technique that may be used to increase the likelihood that the entire set of selected images 124 may be printed without stopping and restarting the print engine 140, thereby decreasing the total time required to print the selected images 124.

After producing the first set of processed images 128a, the image processing unit 126 determines whether there are any additional selected images 124 to process (step 318). If there are no more selected images 124 to process, the method 300 terminates.

If there are additional selected images 124 to process, the image processing unit 126 processes a second set of m images in the selected images 124, thereby producing a second set of processed images 128b (step 320). Although step 318 is shown after step 316 in FIG. 3, the image processing unit 126 may continue processing images immediately after producing the first set of processed images 128a (step 306), so that step 318 may be performed concurrently with one or more of steps 308-316. In other words, the image processing unit 126 may continue to process images in the set of selected images 124 while previous ones of the selected images 124 are being printed by the print server 116.

The number m of images in the second set of processed images 128b may be the same as or differ from the number n of images in the first set of processed images 128a. For example, in one embodiment of the present invention, n=16 and m=1, so that the first 16 of the selected images 124 are processed and transmitted to the print server 116 in a batch prior to the initiation of printing, while after the initiation of printing each of the remaining selected images 124 (if any) is processed and transmitted to the print server 116 individually, in an attempt to ensure that processed images are always available in the RAMdisk FIFO for printing.

The client 114 may need to verify that there is sufficient free space in the RAMdisk to store additional processed images before transmitting them to the server 116. If sufficient space is not available, the client 114 may check again periodically (e.g., every second) and transmit the next set of processed images to the server 116 when sufficient space becomes available in the RAMdisk 134.

Once the image processing unit 126 produces the second set of processed images 128b, the image processing unit 126 may transmit the second set of processed images 128b to the print server 116 (step 322), which may store the second set 128b in the RAMdisk 128b at the end of the FIFO queue (step 324).

The print controller 136 transmits the second set of processed images 128b to the print engine 140 (step 326), and the print engine 140 prints the second set of processed images 128b (step 328). Note that although steps 324-328 are illustrated sequentially in FIG. 3, in practice they may not be performed sequentially. Rather, the client 114 may transmit additional sets of processed images to the server 116 as such sets of processed images become available (provided that there is sufficient room in the RAMdisk to store them), while the server 116 may pull images from the RAMdisk's FIFO queue as the print engine 140 becomes ready to print each additional image. The process of transmitting and storing processed images in the RAMdisk 134 (steps 322-324) and the process of retrieving and printing processed images from the RAMdisk 134 (steps 326-328) may, therefore, be performed relatively asynchronously with respect to each other. These process steps are illustrated sequentially in FIG. 3 merely for ease of illustration and explanation.

After producing the second set of processed images 128b, the image processing unit 126 determines whether there are any additional selected images to process (step 318), as described above. Steps 320-328 are repeated as many times as necessary to process and print all of the selected images 124.

As will now be described in more detail, in various embodiments of the present invention the image processing unit 126 selects an order in which to process the selected images 124 so as to reduce the total print time. In particular, the image processing unit 126 selects an order in which to process the selected images 124 so that the images that are expected to take longest to process are processed first.

Figure 4:
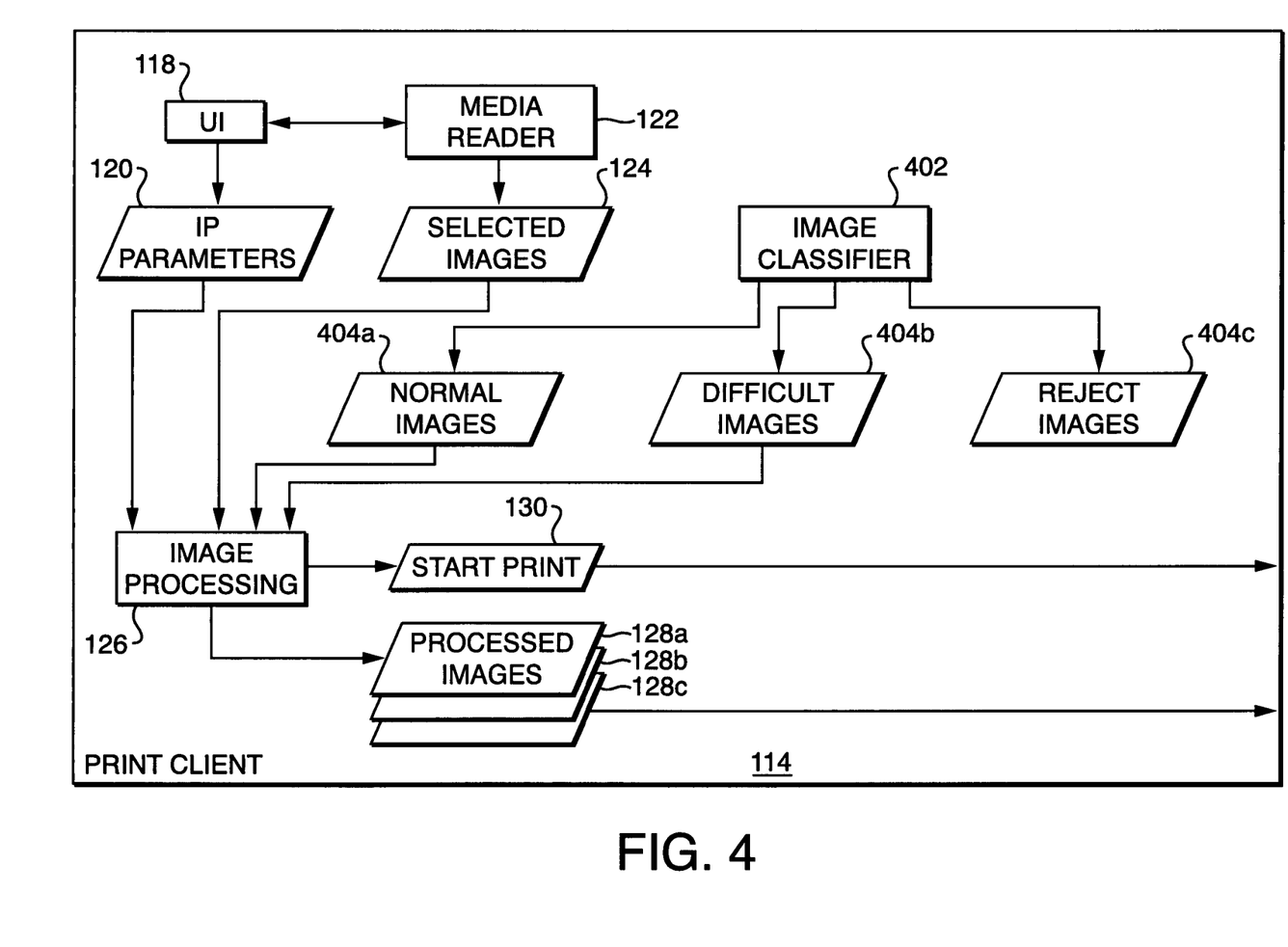
FIG. 4 is a block diagram of an embodiment of the print client of FIG. 1 in which the print client includes an image classifier for sorting images selected by the user into a plurality of image classes.
Figure 5:
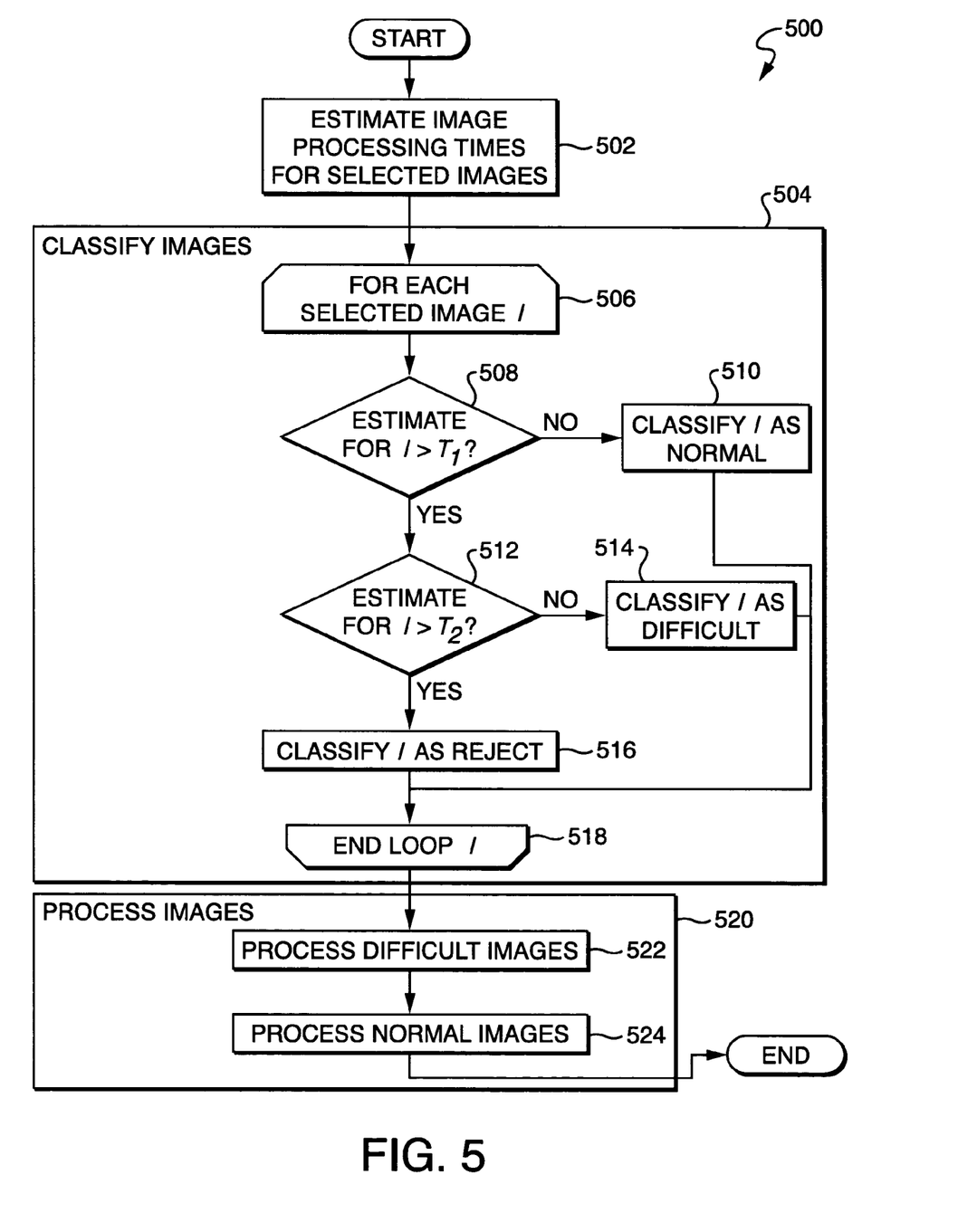
FIG. 5 is a flowchart of a method that selects an order in which to process images selected by the user of the system of FIG. 1 according to one embodiment of the present invention.

Referring to FIG. 5, a flowchart is shown of a method 500 that selects an order in which to process the selected images 124 according to one embodiment of the present invention. Referring to FIG. 4, a block diagram is shown of an embodiment of the print client 114 that may be used to perform the method 500.

The method 500 may, for example, be performed after the user 102 selects images for printing and issues the print command 110 (e.g., FIG. 2, steps 202-204). In the embodiment shown in FIG. 4, the client 114 includes an image classifier 402 that may classify the selected images 124 into three sets: (1) a set of "normal" images 404a, (2) a set of "difficult" images 404b, and (3) a set of "reject" images 404c. Note that one or more of the sets 404a-c may be empty.

Images in the "normal" set 404a are those that may be processed by the image processing unit 126 quickly enough to keep up with the print engine 140. Images in the "difficult" set 404b are images which are expected to take a longer time to process than images in the normal set 404a. As described in more detail below, the image processing unit 126 may process images in the difficult set 404b before processing images in the normal set 404a. Images in the "reject" set 404c are expected to take so long to process that it would not be possible to process them without resulting in an acceptably long amount of time to print the selected images 124.

Referring to FIG. 5, the image classifier 402 estimates an amount of time required to perform image processing on each of the selected images 124 (step 502). The image classifier 402 may produce this estimate in any of a variety of ways. For example, the image classifier 402 may produce an estimate for each of the selected images 124 that is proportional to the number of pixels in the image or the file size of the image.

The image classifier 402 classifies the selected images 124 into normal images 404a, difficult images 404b, and reject images 404c (step 504). More specifically, the image classifier 402 enters a loop over each image I in the set of selected images 124 (step 506). The image classifier 402 determines whether the estimated processing time for image I (obtained in step 502) is greater than a first predetermined threshold $T_1$ (step 508). If $I \leq T_1$, then image I is classified as normal (i.e., placed in the normal set 404a) (step 510). If $I > T_1$, the image classifier 402 determines whether $I > T_2$ (step 512). If $I \leq T_2$, then image I is classified as difficult (i.e., placed in the difficult set 404b) (step 514). Otherwise, image I is classified as a reject (i.e., placed in the reject set 404c) (step 516). Steps 508-516 are repeated for the remaining images in the set of selected images 124 (step 518).

In one embodiment of the present invention, the value of $T_1$ is equal to 20 Mbytes for JPEG images and 10 Mbytes for TIFF and BMP images, while the value of $T_2$ is equal to 100 Mbytes for JPEG images and 50 Mbytes for TIFF and BMP images. These particular threshold values, however, are provided merely as examples and do not constitute limitations of the present invention.

After classifying the selected images 124, the image processing unit 126 processes the selected images 124 in an order that is based upon the classification performed in step 504 (step 520). In particular, the image processing unit 126 processes the difficult images 404b first (step 522), followed by the normal images 404a (step 524). The image processing unit 126 does not process the reject images 404c.

The image processing unit 126 may keep track of the time being spent to process each of the difficult images 404b in step 522, and abort the processing of any difficult images that require more than a particular threshold amount of time to process. This threshold amount of time may, for example, be equal to the time required to print a single image using the print engine 140 (e.g., two seconds). The client 114 may notify the user 102 of any images in the difficult set 404b or reject set 404c that are not printed, such as by displaying an appropriate error message on a display screen (not shown).

Step 520 in FIG. 5 merely illustrates the order in which the selected images 126 are processed by the image processing unit 126. It should be appreciated that in addition to being processed, the selected images 124 may be transmitted to the server 116, stored in the RAMdisk 134, and printed by the print engine 140 using any of the techniques disclosed herein (such as steps 208-214 of the method 200 shown in FIG. 2). Processing the selected images 124 in the order indicated in FIG. 5 will result in the processed versions of the difficult images 404b being placed at the front of the FIFO queue implemented by the RAMdisk 134. In addition to processing the difficult images 404b prior to the normal images 404a, the image processing unit 126 may sort images within the difficult set 404b and/or the normal set 404a in decreasing order of estimated processing time and process the images in the resulting sorted order.

Because the normal images 404a are expected to take less time to process than the difficult images 404b, processing the difficult images 404b first increases the likelihood that the image processing unit 126 will be able to process the remaining normal images 404a sufficiently quickly to keep up with the print engine 140 and thereby enable the print server 116 to print all of the selected images 124 without stopping and restarting the print engine 140.

In addition to various advantages described above, among the advantages of embodiments of the present invention are one or more of the following.

As described above, in various embodiments of the present invention, at least some of the selected images 124 are processed by the image processing unit 126 before the initiation of printing. Performing such preprocessing decreases the image processing load incurred by the client 114 after the initiation of printing, thereby increasing the ability of the client 114 to keep up with the server 116 once printing has started, and thereby decreasing the likelihood that the print engine 140 will need to be stopped and restarted during printing. As a result, preprocessing at least some of the selected images 124 may decrease the overall time required to print the selected images 124.

As further described above, in various embodiments of the present invention, printing is initiated before all of the selected images 124 have been processed by the image processing unit 126. Initiating printing prior to processing of all of the selected images 124 may be advantageous because it decreases the delay between issuance of the print command 110 by the user 102 and the initiation of printing, in comparison to systems which process all selected images prior to initiation of printing. Combining such early print initiation with image preprocessing in the appropriate manner can both decrease the print initiation delay and the total time required to print all of the selected images 124.

As described above, in various embodiments of the present invention, RAMdisk 134 is used to store processed images 128*a-c* in the server 116. Use of RAMdisk 134 may be advantageous in comparison to use of a conventional hard disk drive because the RAMdisk 134 has a shorter and more consistent access time than a hard disk drive. As a result, use of the RAMdisk 134 is more likely to enable the processed images 128*a-c* to be provided to the print engine 140 with a sufficient throughput for the print engine 140 to print all of the processed images 128*a-c* without stopping and restarting.

A further advantage of using RAMdisk 134 to store the processed images 128*a-c* is that the RAMdisk 134 may easily be used to replace a hard disk drive or other storage device previously used by the server 116 to store images. This ease of replacement results from the fact that RAMdisk 134 emulates a hard disk drive and therefore may be accessed using the same logical interface (protocol) as a hard disk drive. As a result, a hard disk drive in the server 116 may be replaced with RAMdisk 134 relatively easily, without requiring changes to the client 114 or other components of the server 116.

More generally, the ability to maintain a sufficiently high throughput of images to the print engine 140 enables the print engine 140 to print at its maximum speed, thereby reducing the overall print time. With an example print engine speed of 1-2 seconds per image, it becomes possible for the user 102 to print anywhere between 30 and 60 images in under a minute. The ability to print images this quickly both enhances the quality of the user's experience and increases the likelihood that the user 102 will choose to use the print kiosk 112 to print images, thereby providing a commercial advantage to the owner/operator of the kiosk 112. The techniques disclosed herein may also scale to work in conjunction with faster buses, larger images, and faster print engines.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions. For example, the user interface 118 and image processing unit 126 may be combined or further subdivided into additional components for performing the same functions. Similarly, the print controller 136 and print engine 140 may be combined or further subdivided into additional components for performing the same function. The print client 114 and print server 116 may be combined into a single component, so that the print kiosk 112 does not operate using a client-server architecture. Furthermore, the client 114 and server 116 need not be implemented within a single physical housing. Rather, the client 114 and server 116 may be housed separately. In addition, the server 116 may be coupled to multiple clients, in which case each client may be allocated a portion (e.g., partition or directory) of the RAMdisk 134 for storing processed images. Although the bus 132 is described above as an Ethernet bus, the bus 132 may be any communications channel for carrying communications between the client 114 and server 116.

Messages transmitted between the client 114 and server 116 (such as the start print command 130) may have any format, and the client 114 and server 116 may communicate with each other using any messaging protocol. For example, the client 114 and server 116 may communicate with each other by transmitting messages contained within files or by transmitting messages using the "sockets" mechanism available in many operating systems.

Although the print kiosk 112 is described above as a standalone vending machine, this is not a requirement of the present invention. Rather, the print kiosk 112 more generally represents any system for performing the functions described herein. Furthermore, although the print engine 140 is described herein as using a thermal transfer method of printing, this is not a requirement of the present invention. Rather, the print kiosk 112 may print images using any printing method.

The print kiosk 112 may receive digital images from any source. Therefore, the storage medium 104 need not be a storage medium capable of use in a digital camera, but rather may be any medium containing one or more digital or analog images, such as a floppy diskette, CD-ROM, or printed image (in which case the media reader 122 may include a scanner). Furthermore, the printed images 142 may be printed on any output medium of any size.

The particular classification scheme described above with respect to FIGS. 4-5 is provided merely as an example and does not constitute a limitation of the present invention. If the selected images 124 are classified, other classification schemes may be used. For example, the selected images 124 may be classified into two sets, such as normal and difficult or normal and reject, rather than the three sets 404*a-c* shown in FIG. 5.

In the examples described above, the image processing unit 126 does not begin processing the selected images 124 until the user 102 issues the print command 110. Alternatively, the image processing unit 126 may process the selected images 124 as they are selected by the user 102 for printing. For example, when the user 102 selects a first one of the digital images 106, the selected image may be processed immediately by the image processing unit 126. The resulting processed image may be transmitted to and stored in the RAMdisk 134, without waiting for additional images to be selected by the user 102. As the user 102 selects additional images, each such image may be processed and stored in the RAMdisk 134 in the same manner. If the RAMdisk 134 becomes full, the image processing unit 126 may continue to process images as they are selected by the user 102 and store them locally in the client 114.

When the user 102 issues the print command 110, the client 114 may verify that n images (or the total number of selected images 124, whichever is greater) are stored in the RAMdisk 134. If n images are stored in the RAMdisk, the client 114 may issue the start print command 130 to the print server 116 and continue to process any remaining selected images, as described above with respect to FIG. 2. If n images are not stored in the RAMdisk 134, the image processing unit 126 may continue to process any remaining selected images, as described above with respect to FIG. 2, and issue the start print command 130 to the print server 116 once n images or all of the selected images 124 have been processed, whichever comes first.

If the user 102 deselects an image that has already been processed and stored in the RAMdisk 134, the client 114 may transmit a "delete" command (not shown) to the print server 116, in response to which the print server 116 may delete the deselected image from the RAMdisk 134. The next one of the processed images 128*a-c* may then be transmitted to and stored in the RAMdisk 134.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method for printing a plurality of digital images, the method comprising:

determining, by a computing device, an expected image processing time of each of the plurality of digital images;

comparing, by the computing device, the expected image processing time of each of the plurality of digital images to a threshold amount of time, wherein the threshold amount of time is based at least in part on an amount of time to print an image using a print engine;

performing, by the computing device, image processing on the plurality of digital images to produce a plurality of processed images, wherein the image processing is performed on the plurality of digital images in an order based at least in part on the expected image processing time of each of the plurality of digital images; and printing a first plurality of processed images using the print engine.

2. The method of claim 1, wherein the image processing is performed by a print client, and wherein the method further comprises:

transmitting the first plurality of processed images from the print client to a server over a communications bus.

3. The method of claim 1, wherein the image processing comprises at least one of red-eye reduction, contrast correction, or brightness correction.

4. The method of claim 1, wherein the image processing performed on the plurality of digital images is designated by a user.

5. The method of claim 1, further comprising:

resizing the plurality of processed images before printing the first plurality of processed images, wherein the resizing is based at least in part on a size of an output medium upon which the plurality of processed images will be printed.

6. The method of claim 1, wherein the plurality of digital images comprises a first subset of digital images and a second subset of digital images, wherein the expected image processing time for the digital images in the first subset of digital images is greater than the threshold amount of time, and wherein the expected image processing time for the digital images in the second subset of digital images is less than the threshold amount of time.

7. The method of claim 6, wherein performing the image processing comprises performing the image processing on the first subset of digital images before performing the image processing on the second subset of digital images.

8. A system for printing a plurality of digital images, the system comprising:

means for determining an expected image processing time of each of the plurality of digital images;

means for comparing the expected image processing time of each of the plurality of digital images to a threshold amount of time, wherein the threshold amount of time is based at least in part on an amount of time to print an image using a print engine;

means for performing image processing on the plurality of digital images to produce a plurality of processed images, wherein the means for performing image processing is configured to perform the image processing on the plurality of digital images in an order based at least in part on the expected image processing time of each of the plurality of digital images; and means for printing the plurality of processed images using the print engine.

9. The system of claim 8, wherein the means for performing image processing comprises means for performing at least one of red-eye reduction, contrast correction, or brightness correction.

10. The system of claim 8, further comprising:
means for receiving a user designation of the image processing to be performed on the plurality of digital images.

11. The system of claim 8, further comprising:
means for resizing the plurality of processed images before printing the first plurality of processed images, wherein the resizing is based at least in part on a size of an output medium upon which the plurality of processed images will be printed.

12. The system of claim 8, wherein the plurality of digital images comprises a first subset of digital images and a second subset of digital images, wherein the expected image processing time for the digital images in the first subset of digital images is greater than the threshold amount of time, and wherein the expected image processing time for the digital images in the second subset of digital images is less than the threshold amount of time.

13. The system of claim 12, wherein the means for performing the image processing is configured to perform the image processing on the first subset of digital images before performing the image processing on the second subset of digital images.

14. A computer-readable storage device comprising instructions for printing a plurality of digital images, the instructions comprising:
instructions to determine an expected image processing time of each of the plurality of digital images;
instructions to compare the expected image processing time of each of the plurality of digital images to a threshold amount of time, wherein the threshold amount of time is based at least in part on an amount of time to print an image using a print engine;
instructions to perform image processing on the plurality of digital images to produce a plurality of processed images, wherein the image processing is performed on the plurality of digital images in an order based at least in part on the expected image processing time of each of the plurality of digital images; and
instructions to print the plurality of processed images using the print engine.

15. The computer-readable storage device of claim 14, wherein the image processing is performed by a print client, and wherein the instructions further comprise:
instructions to transmit the plurality of processed images from the print client to a server over a communications bus.

16. The computer-readable storage device of claim 14, wherein the image processing comprises at least one of red-eye reduction, contrast correction, or brightness correction.

17. The computer-readable storage device of claim 14, wherein the image processing performed on the plurality of digital images is designated by a user.

18. The computer-readable storage device of claim 14, the instructions further comprising:
instructions to resize the plurality of processed images before printing the plurality of processed images, wherein resizing the plurality of processed images is based at least in part on a size of an output medium upon which the plurality of processed images will be printed.

19. The computer-readable storage device of claim 14, wherein the plurality of digital images comprises a first subset of digital images and a second subset of digital images, wherein the expected image processing time for the digital images in the first subset of digital images is greater than the threshold amount of time, and wherein the expected image processing time for the digital images in the second subset of digital images is less than the threshold amount of time.

20. The computer-readable storage device of claim 19, wherein the instructions to perform the image processing comprise instructions to perform the image processing on the first subset of digital images before performing the image processing on the second subset of digital images.

* * * * *